(12) United States Patent
Mikkola et al.

(10) Patent No.: US 11,046,600 B2
(45) Date of Patent: Jun. 29, 2021

(54) METHOD FOR TREATING PRODUCED WATER (71) Applicant: KEMIRA OYJ, Helsinki (FI)

(72) Inventors: Esa Mikkola, Helsinki (FI); Tapio Honkanen, Porvoo (FI); Vesa Nuutinen, Helsinki (FI)

(73) Assignee: KEMIRA OYJ, Helsinki (FI)

( * ) Notice: Subject to any disclaimer, the term of this patent is extended or adjusted under 35 U.S.C. 154(b) by 301 days.

(21) Appl. No.: 16/032,528

(22) Filed: Jul. 11, 2018

(65) Prior Publication Data

US 2020/0017385 A1   Jan. 16, 2020

(51) Int. Cl.
| | | |
|---|---|---|
| *C02F 1/70* | (2006.01) | |
| *C02F 1/68* | (2006.01) | |
| *C02F 103/36* | (2006.01) | |
| *C02F 103/10* | (2006.01) | |

(52) U.S. Cl.
CPC ............... *C02F 1/705* (2013.01); *C02F 1/68* (2013.01); *C02F 2103/10* (2013.01); *C02F 2103/365* (2013.01)

(58) Field of Classification Search
CPC ........ C02F 1/68; C02F 1/705; C02F 2103/10; C02F 2103/365
See application file for complete search history.

(56) References Cited

U.S. PATENT DOCUMENTS

| | | | |
|---|---|---|---|
| 2012/0108473 A1 | 3/2012 | Pich et al. | |
| 2019/0292079 A1* | 9/2019 | Favero | .................... C02F 1/725 |

FOREIGN PATENT DOCUMENTS

| | | | | |
|---|---|---|---|---|
| EP | 3 447 106 | | 2/2019 | |
| WO | 2002/004360 | | 1/2002 | |
| WO | 2017/001988 | | 5/2017 | |
| WO | WO-2018020175 A1 * | 2/2018 | ................ C02F 1/24 |
| WO | 2018/165168 | | 9/2018 | |

* cited by examiner

*Primary Examiner* — Lucas A Stelling
(74) *Attorney, Agent, or Firm* — Robin L. Teskin; Baker, Donelson, Bearman, Caldwell & Berkowitz PC (57) ABSTRACT

The present embodiments generally relate to the treatment of produced water such as produced water resulting from an industrial process such as one involving the use of copious amounts of water and the addition of one or more polymers such as viscosifying or thickening polymers, in particular enhanced oil recovery processes or another processes resulting in polymer flooded produced water. These treatment methods include contacting the produced water with one or more reducing agents and one or more metals, wherein said treatment may result in a reduction of the viscosity of said produced water and/or the degradation of polymers which are contained therein.

22 Claims, 1 Drawing Sheet

METHOD FOR TREATING PRODUCED WATER

FIELD OF THE ART

The present disclosure generally relates to the treatment of produced water which comprises one or more water soluble polymers, such as from an enhanced oil recovery process, in order to reduce the viscosity thereof and/or degrade at least a portion of the one or more water soluble polymers contained therein.

BACKGROUND

Enhanced oil recovery (EOR) is a technique that can be used to increase the amount of unrefined petroleum (e.g., crude oil) that may be extracted from an oil reservoir (e.g., an oil field). By way of example, using EOR, about 40-60% of the reservoir's original oil can typically be extracted, compared with only 20-40% using traditional primary and secondary recovery techniques (e.g., by water injection or natural gas injection). One type of EOR technique is polymer flooding, which typically involves the injection of large volumes of a polymer solution into a subterranean oil reservoir. The polymer solution can mobilize the oil towards a production well where it can be recovered. The produced water from a polymer flooding process can include various chemicals. These chemicals, including the polymer(s) used for the polymer flooding, may have a direct impact on viscosity and viscoelastic properties of the produced water. The properties and contents of the produced water can also influence discharge of the produced water into the sea, as polymers that may be used for polymer flooding, e.g., partially hydrolyzed polyacrylamide (HPAM), typically may not be readily bio-degradable according to current regulations.

Current technologies for the treatment of produced water (e.g., produced water resulting from EOR processes) can include mechanical treatments (e.g., membrane filtration), chemical treatments (e.g., oxidizing agents), and biological treatments (e.g., microbiological processes). The development of other means for treating produced water which allow for the treated water to be stabilized or reused would be beneficial for both offshore and onshore facilities.

BRIEF SUMMARY

The present embodiments generally pertain to a process for treating produced water comprising one or more water soluble polymers comprising treating the produced water with an amount of one or more reducing agents and one or more metals that is effective to reduce the viscosity of the produced water and/or to degrade at least a portion of the one or more water soluble polymers. In some embodiments, said water soluble polymers may include high molecular weight polymers used in industrial processes such as enhanced oil recovery (EOR) processes and other processes wherein produced water is produced and/or treated. In some embodiments, the treated produced water may be anoxic and/or the produced water may be treated in whole or in part under anoxic conditions. In some embodiments, said one or more water soluble polymers comprise oxygen. Moreover, in some embodiments, oxygen may be added to said produced water, and addition of said oxygen may occur before, during, and/or after treatment of said produced water with said one or more reducing agents and said metal. Addition of oxygen may occur through addition of water containing dissolved oxygen, such as by the addition of surface water; air bubbling; and/or pressurized air. In some embodiments, addition of oxygen may result in a corresponding increase in the degradation of said polymer, optionally wherein the amount of added oxygen correlates to the amount of degradation, and/or a corresponding decrease in the viscosity of the produced water.

In some embodiments, said one or more metals comprise iron and/or a compound comprising iron, optionally in the $Fe^{+2}$ form. In some embodiments, said one or more reducing agents comprise a compound comprising metabisulfite, bisulfite, (hydrated) sulfur dioxide, and/or sulfite. In some embodiments, said one or more reducing agents may comprise hydrazine and/or its hydroxylamine derivatives and/or a mixture of sodium borohydride and bisulfite. In some embodiments, said one or more reducing agents may comprise organic sulfites such as alkyl sulfites, alkyl hydrosulfites, sulfinates, sulfoxylates, phosphites, and also oxalic or formic acid or salts of erythorbate and carbohydrazides; an oxygen scavenger, such as, but not limited to, carbohydrazide, hydroquinone, diethylhydroxylamine (DEHA), methyl ethyl ketoxime (MEKO), erythorbate; iron; the salt form of any compound that may be considered a reducing agent, such as sodium metabisulfite; and/or sodium dithionite.

Furthermore, the present disclosure generally relates to a process of treating produced water that includes the addition of one or more reducing agents and one or more metals during treatment of the produced water wherein at least one stabilizing agent is added to slow, decrease, prevent, inhibit and/or stop the degradation or further degradation of water soluble polymers and/or to increase or maintain the viscosity of the produced water. In some embodiments, the at least one stabilizing agent may be added while water soluble polymers are present in the produced water in order to slow, decrease, prevent, inhibit, and/or stop the degradation or further degradation of said at least one water soluble polymer and/or to increase or maintain the viscosity of the produced water. In some embodiments, the at least one stabilizing agent may be added contemporaneous or prior to the addition of at least one water soluble polymer in order to slow, decrease, prevent, inhibit, and/or stop the degradation of said added at least one water soluble polymer and/or to increase or maintain the viscosity of the produced water.

Additionally, the present disclosure generally relates to a process for treating produced water comprising one or more water soluble polymers, comprising: a. treating the produced water with an amount of one or more reducing agents and one or more metals that is effective to reduce the viscosity of the produced water and/or to degrade at least a portion of the one or more water soluble polymers; b. adding an amount of stabilizer effective to slow, reduce, decrease, inhibit, prevent, and/or stop degradation of said one or more water soluble polymers; and optionally c. adding new and/or fresh water soluble polymer. In some embodiments, said stabilizer reduces, decreases, stops, and/or prevents degradation of said new and/or fresh water soluble polymer. In some embodiments, said stabilizing agent comprises thiourea, diethylthiourea, sodium/ammonium thiocyanate, benzotriazole, MBI, and/or MBT.

Moreover, the present disclosure generally pertains to a composition suitable for use in treating produced water, comprising the combination of (i) one or more stabilizing agents and either or both of the following: (ii) one or more reducing agents and one or more metals, and (iii) one or more water soluble polymers; wherein the one or more stabilizing agents are capable of preventing or inhibiting the degradation of (iii) one or more water soluble polymer by the (ii) one or more reducing agents and one or more metals if said (iii) one or more water soluble present. In some embodiments, said composition may comprise (i) one or more stabilizing agents, (ii) one or more reducing agents and one or more metals, and (iii) one or more water soluble polymers.

DETAILED DESCRIPTION

Definitions

As used herein the singular forms "a", "and", and "the" include plural referents unless the context clearly dictates otherwise. All technical and scientific terms used herein have the same meaning as commonly understood to one of ordinary skill in the art to which this invention belongs unless clearly indicated otherwise.

As used herein, the term "enhanced oil recovery" or "EOR" (sometimes also known as improved oil recovery ("IOR") or tertiary mineral oil production) generally refers to techniques for increasing the amount of unrefined petroleum (for example, crude oil) that may be extracted from an oil reservoir, such as an oil field. Examples of EOR techniques include, for example, miscible gas injection (e.g., carbon dioxide flooding), chemical injection (sometimes referred to as chemical enhanced oil recovery ("CEOR"), and which includes, for example, polymer flooding, alkaline flooding, surfactant flooding, micellar polymer flooding, conformance control operations, as well as combinations thereof such as alkaline-polymer flooding or alkaline-surfactant-polymer flooding), microbial injection, and thermal recovery (e.g., cyclic steam, steam flooding, or fire flooding). In some embodiments, the EOR operation may include a polymer ("P") flooding operation, an alkaline-polymer ("AP") flooding operation, a surfactant-polymer ("SP") flooding operation, an alkaline-surfactant-polymer ("ASP") flooding operation, a conformance control operation, or any combination thereof.

As used herein, the terms "polymer flood" or "polymer flooding" generally refer to a chemical enhanced EOR technique that typically involves injecting an aqueous fluid that is viscosified with one or more water-soluble polymers through injection boreholes into an oil reservoir to mobilize oil left behind after primary and/or secondary recovery. As a general result of the injection of one or more polymers, the oil may be forced in the direction of the production borehole, and the oil may be produced through the production borehole. Details of examples of polymer flooding and of polymers suitable for this purpose are disclosed, for example, in "Petroleum, Enhanced Oil Recovery, Kirk-Othmer, Encyclopedia of Chemical Technology, online edition, John Wiley & Sons, 2010", which is herein incorporated by reference in its entirety. One or more surfactants may be injected (or formed in situ) as part of the EOR technique. Surfactants may function to reduce the interfacial tension between the oil and water, which may reduce capillary pressure and improve mobilization of oil. Surfactants may be injected with polymers (e.g., a surfactant-polymer (SP) flood), or formed in-situ (e.g., an alkaline-polymer (AP) flood), or a combination thereof (e.g., an alkaline-surfactant-polymer (ASP) flood). As used herein, the terms "polymer flood" and "polymer flooding" encompass all of these EOR techniques.

As used herein, the term "monomer" generally refers to nonionic monomers, anionic monomers, cationic monomers, zwitterionic monomers, betaine monomers, and amphoteric ion pair monomers.

As used herein, the terms "polymer," "polymers," "polymeric," and similar terms are used in their ordinary sense as understood by one skilled in the art, and thus may be used herein to refer to or describe a large molecule (or group of such molecules) that may comprise recurring units. Polymers may be formed in various ways, including by polymerizing monomers and/or by chemically modifying one or more recurring units of a precursor polymer. Unless otherwise specified, a polymer may comprise a "homopolymer" that may comprise substantially identical recurring units that may be formed by various methods e.g., by polymerizing a particular monomer. Unless otherwise specified, a polymer may also comprise a "copolymer" that may comprise two or more different recurring units that may be formed by, e.g., copolymerizing, two or more different monomers, and/or by chemically modifying one or more recurring units of a precursor polymer. Unless otherwise specified, a polymer or copolymer may also comprise a "terpolymer" that may comprise polymers that may comprise three or more different recurring units. The term "polymer" as used herein is intended to include both the acid form of the polymer as well as its various salts. Polymers may be amphoteric in nature, i.e., containing both anionic and cationic substituents, although not necessarily in the same proportions.

As used herein the term "nonionic monomer" generally refers to a monomer that possesses a neutral charge. Nonionic monomers may comprise but are not limited to comprising monomers selected from the group consisting of acrylamide ("AMD"), methacrylamido, vinyl, allyl, ethyl, and the like, all of which may be substituted with a side chain selected from, for example, an alkyl, arylalkyl, dialkyl, ethoxyl, and/or hydrophobic group. In some embodiments, a nonionic monomer may comprise AMD. In some embodiments, nonionic monomers may comprise but are not limited to comprising vinyl amide (e.g., acrylamide, methacrylamide, N-methylacrylamide, N,N-dimethylacrylamide), acryloylmorpholine, acrylate, maleic anhydride, N-vinylpyrrolidone, vinyl acetate, N-vinyl formamide and their derivatives, such as hydroxyethyl (methyl)acrylate CH2=CR—COO—CH2CH2OH (I) and CH2=CR—CO—N(Z1)(Z2) (2) N-substituted (methyl)acrylamide (II). R=H or Me; Z1=5-15C alkyl; 1-3C alkyl substituted by 1-3 phenyl, phenyl or 6-12C cycloalkyl (both optionally substituted) and Z2=H; or Z1 and Z2 are each 3-10C alkyl; (II) is N-tert. hexyl, tert. octyl, methylundecyl, cyclohexyl, benzyl, diphenylmethyl or triphenyl acrylamide. Nonionic monomers further may include dimethylaminoethylacrylate ("DMAEMA"), dimethylaminoethyl methacrylate ("DMAEM"), N-isopropylacrylamide and N-vinyl formamide. Nonionic monomers can be combined, for example to form a terpolymer of acrylamide, N-vinyl formamide, and acrylic acid.

As used herein, the term "anionic monomers" may refer to either anionic monomers that are substantially anionic in whole or (in equilibrium) in part, at a pH in the range of about 4.0 to about 9.0. The "anionic monomers" may be neutral at low pH (from a pH of about 2 to about 6), or to anionic monomers that are anionic at low pH.

Examples of anionic monomers which may be used herein include but are not limited to those comprising acrylic, methacrylic, maleic monomers and the like, calcium diacrylate, and/or any monomer substituted with a carboxylic acid group or salt thereof. In some embodiments, these anionic monomers may be substituted with a carboxylic acid group, and include, for example, acrylic acid, and methacrylic acid. In some embodiments, an anionic monomer which may be used herein may be a (meth)acrylamide monomer wherein the amide group has been hydrolyzed to a carboxyl group. Said monomer may be a derivative or salt of a monomer according to the embodiments. Additional examples of anionic monomers comprise but are not limited to those comprising sulfonic acids or a sulfonic acid group, or both. In some embodiments, the anionic monomers which may be used herein may comprise a sulfonic function that may comprise, for example, 2-acrylamido-2-methylpropane sulfonic acid ("AMPS"). In some embodiments, anionic monomers may comprise organic acids. In some embodiments, anionic monomers may comprise acrylic acid, methacrylic acid, maleic acid, itaconic acid, acrylamido methylpropane sulfonic acid, vinylphosphonic acid, styrene sulfonic acid and their salts such as sodium, ammonium and potassium. Anionic monomers can be combined, for example, to form a terpolymer of acrylamide, acrylic acid and 2-acrylamido-2-methylpropane sulfonic acid.

As used herein, the term "cationic monomer" generally refers to a monomer that possesses a positive charge. Examples of cationic monomers may comprise but are not limited to those comprising acryloyloxy ethyl trimethyl ammonium chloride ("AETAC"), methacryloyloxyethyltrimethylammonium chloride, methacrylamidopropyltrimethylammonium chloride ("MAPTAC"), acrylamidopropyltrimethylammonium chloride, methacryloyloxyethyldimethylammonium sulfate, dimethylaminoethyl acrylate, dimethylaminopropylmethacrylamide, Q6, Q6o 4, and/or diallyldimethylammonium chloride ("DADMAC").

Said cationic monomers may also comprise but are not limited to comprising dialkylaminoalkyl acrylates and methacrylates and their quaternary or acid salts, including, but not limited to, dimethylaminoethyl acrylate methyl chloride quaternary salt ("DMAEA.MCQ"), dimethylaminoethyl acrylate methyl sulfate quaternary salt ("DMAEM.MCQ"), dimethyaminoethyl acrylate benzyl chloride quaternary salt ("DMAEA.BCQ"), dimethylaminoethyl acrylate sulfuric acid salt, dimethylaminoethyl acrylate hydrochloric acid salt, diethylaminoethyl acrylate, methyl chloride quaternary salt, dimethylaminoethyl methacrylate methyl chloride quaternary salt, dimethylaminoethyl methacrylate methyl sulfate quaternary salt, dimethylaminoethyl methacrylate benzyl chloride quaternary salt, dimethylaminoethyl methacrylate sulfuric acid salt, dimethylaminoethyl methacrylate hydrochloric acid salt, dimethylaminoethyl methacryloyl hydrochloric acid salt, dialkylaminoalkylacrylamides or methacrylamides and their quaternary or acid salts such as acrylamidopropyltrimethylammonium chloride, dimethylaminopropyl acrylamide methyl sulfate quaternary salt, dimethylaminopropyl acrylamide sulfuric acid salt, dimethylaminopropyl acrylamide hydrochloric acid salt, methacrylamidopropyltrimethylammonium chloride, dimethylaminopropyl methacrylamide methyl sulfate quaternary salt, dimethylaminopropyl methacrylamide sulfuric acid salt, dimethylaminopropyl methacrylamide hydrochloric acid salt, diethylaminoethylacrylate, diethyl aminoethylmethacrylate and diallyldialkylammonium halides such as diallyldiethylammonium chloride and diallyldimethyl ammonium chloride. Alkyl groups may generally but are not limited to those comprising $C_{1-8}$ alkyl groups. In some embodiments, cationic monomers may comprise quaternary ammonium or acid salts of vinyl amide, vinyl carboxylic acid, methacrylate and their derivatives. Cationic monomers may comprise but are not limited to comprising monomers selected from the group consisting of dimethylaminoethylacrylate methyl chloride quaternary salt, dimethylaminoethylmethacrylate methyl chloride quaternary salt, and diallyldimethyl ammonium chloride. Cationic monomers can be combined, for example, to form a terpolymer of dimethylaminoethylmethacrylate methyl chloride quaternary salt, and diallyldimethyl ammonium chloride and acrylamide.

The term "water-soluble polymer" generally refers to any polymer that may dissolve, disperse, or swell in water. Said polymers may modify the physical properties of aqueous systems undergoing gellation, thickening, viscosification, or emulsification/stabilization. Said polymers may perform a variety of functions, including but not limited to use as dispersing and suspending agents, stabilizers, thickeners, viscosifiers, gellants, flocculants and coagulants, film-formers, humectants, binders, and lubricants.

In the context of polymer flooding, a water-soluble polymer may include, but not be limited to including, one or more high molecular weight polyacrylamide and/or copolymers of acrylamide and further monomers, for example, vinylsulfonic acid or acrylic acid. Polyacrylamide may be partly hydrolyzed polyacrylamide ("HPAM"), in which some of the acrylamide units have been hydrolyzed to acrylic acid. In some embodiments, a water soluble polymer may comprise a high molecular weight anionic polyacrylamide based polymer. Naturally occurring polymers may also be used, for example, xanthan or polyglycosylglucan. Naturally occurring polymers may be used in their natural form and/or in a modified form.

In some embodiments, a water-soluble polymer may comprise one or more acrylamide (co)polymers. In some embodiments, one or more acrylamide (co)polymers may be a polymer useful for enhanced oil recovery (EOR) applications. In a particular embodiment, a water-soluble polymer is a high molecular weight polyacrylamide and/or partially hydrolyzed products thereof.

According to some embodiments, one or more acrylamide (co)polymers may be selected from water-soluble acrylamide (co)polymers. In some embodiments, acrylamide (co) polymers may comprise at least 30% by weight, or at least 50% by weight acrylamide units with respect to the total amount of all monomeric units in the (co)polymer.

Optionally, one or more acrylamide (co)polymers may comprise acrylamide and at least one additional monomer. In some embodiments, an acrylamide (co)polymer may comprise less than about 50%, or less than about 40%, or less than about 30%, or less than about 20% by weight of the at least one additional monomer. In some embodiments, the additional monomer may be a water-soluble, ethylenically unsaturated, in particular monoethylenically unsaturated, monomer. Additional water-soluble monomers may be miscible with water in any ratio, but it is typically sufficient that the monomers dissolve sufficiently in an aqueous phase to copolymerize with acrylamide. In general, the solubility of such additional monomers in water at room temperature may be at least 50 g/L, at least 150 g/L, and/or at least 250 g/L.

Other water soluble monomers may comprise one or more hydrophilic groups. The hydrophilic groups may be functional groups that may comprise atoms selected from the group of O-, N-, S- or P-atoms. Nonlimiting examples of such functional groups comprise carbonyl groups $>C=O$, ether groups $—O—$, in particular polyethylene oxide groups $—(CH_2—CH_2—O—)_n—$, where n e.g., is a number from 1 to 200, hydroxy groups —OH, ester groups —C(O)O—, primary, secondary or tertiary amino groups, ammonium groups, amide groups —C(O)—NH— or acid groups such as carboxyl groups —COOH, sulfonic acid groups —SO$_3$H, phosphonic acid groups —PO$_3$H$_2$ or phosphoric acid groups —OP(OH)$_3$.

Some monoethylenically unsaturated monomers comprising acid groups may comprise monomers comprising —COOH groups, such as acrylic acid or methacrylic acid, crotonic acid, itaconic acid, maleic acid or fumaric acid, monomers comprising sulfonic acid groups, such as vinylsulfonic acid, allylsulfonic acid, 2-acrylamido-2-methylpropanesulfonic acid, 2-methacrylamido-2-methylpropanesulfonic acid, 2-acrylamidobutanesulfonic acid, 3-acrylamido-3-methylbutanesulfonic acid or 2-acrylamido-2,4,4-trimethylpentanesulfonic acid, or monomers comprising phosphonic acid groups, such as vinylphosphonic acid, allylphosphonic acid, N-(meth)acryl amidoalkylphosphonic acids or (meth)acryloyloxyalkylphosphonic acids. Said monomers may be used as salts.

The —COOH groups in polyacrylamide (co)polymers may not only be obtained by copolymerizing acrylamide and monomers comprising —COOH groups but also by hydrolyzing derivatives of —COOH groups after polymerization. For example, amide groups —CO—NH$_2$ of acrylamide may hydrolyze thus yielding —COOH groups.

Also to be mentioned are monomers which are derivatives of acrylamide, such as, for example, N-alkyl acrylamides and N-alkyl quaternary acrylamides, wherein the alkyl group may be C$_2$-C$_{28}$; N-methyl(meth)acrylamide, N,N'-dimethyl(meth)acrylamide, and N-methylolacrylamide; N-vinyl derivatives such as N-vinylformamide, N-vinylacetamide, N-vinylpyrrolidone or N-vinylcaprolactam; and vinyl esters, such as vinyl formate or vinyl acetate. N-vinyl derivatives may be hydrolyzed after polymerization to vinylamine units, vinyl esters to vinyl alcohol units.

Further monomers may comprise monomers comprising hydroxy and/or ether groups, such as, for example, hydroxyethyl(meth)acrylate, hydroxypropyl(meth)acrylate, allyl alcohol, hydroxyvinyl ethyl ether, hydroxyl vinyl propyl ether, hydroxyvinyl butyl ether or polyethyleneoxide(meth)acrylates.

Other monomers may be monomers comprising ammonium groups, i.e., monomers having cationic groups. Examples of said monomers may comprise salts of 3-trimethylammonium propylacrylamides or 2-trimethylammonium ethyl(meth)acrylates, for example the corresponding chlorides, such as 3-trimethylammonium propylacrylamide chloride (DIMAPAQUAT), and 2-trimethylammonium ethyl methacrylate chloride (MADAME-QUAT).

Yet other monomers may comprise monomers which may cause hydrophobic association of the (co)polymers. Such monomers may comprise, in addition to an ethylenic group and a hydrophilic part, a hydrophobic part.

In some embodiments, one or more acrylamide (co) polymers may optionally comprise crosslinking monomers, i.e., monomers comprising more than one polymerizable group. In certain embodiments, one or more acrylamide (co)polymers may optionally comprise crosslinking monomers in an amount of less than about 0.5%, or about 0.1%, by weight, based on the amount of all monomers.

In an embodiment, one or more acrylamide (co)polymers may comprise at least one monoethylenically unsaturated monomer comprising acid groups, for example monomers that comprise at least one group selected from —COOH, —SO$_3$H or —PO$_3$H$_2$. Examples of such monomers may include, but are not limited to, acrylic acid, methacrylic acid, vinylsulfonic acid, allylsulfonic acid or 2-acrylamido-2-methylpropanesulfonic acid, preferably acrylic acid and/or 2-acrylamido-2-methylpropanesulfonic acid, and more preferably acrylic acid or salts thereof. In some embodiments the one or more acrylamide (co)polymers, or each of the one or more acrylamide (co) polymers, may comprise 2-acrylamido-2-methylpropanesulfonic acid or salts thereof. The amount of such monomers comprising acid groups may be from about 0.1% to about 70%, about 1% to about 50%, or about 10% to about 50% by weight based on the amount of all monomers.

In an embodiment, one or more acrylamide (co)polymers may comprise from about 50% to about 90% by weight of acrylamide units and from about 10% to about 50% by weight of acrylic acid units and/or their respective salts. In an embodiment, one or more acrylamide (co)polymers may comprise from about 60% to 80% by weight of acrylamide units and from 20% to 40% by weight of acrylic acid units.

In some embodiments, one or more acrylamide (co) polymers may have a weight average molecular weight ($M_w$) of greater than about 5,000,000 Dalton, or greater than about 10,000,000 Dalton, or greater than about 15,000,000 Dalton, or greater than about 20,000,000 Dalton, or greater than about 25,000,000 Dalton.

As used herein, the terms "polyacrylamide" or "PAM" generally refer to polymers and co-polymers comprising acrylamide moieties, and the terms encompass any polymers or copolymers comprising acrylamide moieties, e.g., one or more acrylamide (co)polymers. Furthermore, PAMs may comprise any of the polymers or copolymers discussed herein. Additionally, the PAMs described herein, e.g., one or more acrylamide (co)polymers, may be provided in one of various forms, including, for example, dry (powder) form (e.g., DPAM), water-in-oil emulsion (inverse emulsion), suspension, dispersion, or partly hydrolyzed (e.g., HPAM, in which some of the acrylamide units have been hydrolyzed to acrylic acid). In some embodiments, PAMs, e.g., one or more acrylamide (co)polymers, may be used for polymer flooding. In some embodiments, PAMS, e.g., one or more acrylamide (co)polymers, may be used in any EOR technique.

As used herein, the term "produced water" generally refers to any aqueous fluids produced during any type of industrial process, e.g., an oil or gas extraction or recovery process, or any portion thereof, such as but not limited to any enhanced oil recovery process or any portion thereof wherein the produced water comprises one or more polymers, e.g., one or more water-soluble polymers. Typically the produced water may be obtained during an industrial process involving the use of water, generally copious amounts of water, and the use of one or more water soluble polymers, e.g., viscosifying or thickening polymers, wherein the end product of such industrial process may be an aqueous material or "produced water" which may be of undesirable viscosity and/or purity because of the presence of an undesirable amount of said one or more water soluble polymers.

According to some embodiments, the produced water may be formed during any part of a process related to polymer flooding and may comprise any components and/or chemicals related to any part of said polymer flooding. This may be referred to as "polymer flooded produced water" or "polymer flooding produced water", and the term produced water is to be understood to encompass any type of polymer flooded produced water or polymer flooding produced water.

Produced water may be anoxic produced water. Produced water may be anaerobic produced water or may be aerobic produced water.

As used herein, the term "metal" generally refers to both elements that may be considered metals, such as iron, and compounds comprising one or more metals, such as, for example, ferrous chloride.

As used herein, the term "iron" generally refers to any form of iron, for example, iron of any isotopic state, iron of any oxidation state, any form of an iron compound, such as, for example, iron (III) chloride, iron (II) chloride (also known as ferrous chloride), iron (III) chloride hexahydrate, and iron sulfate. In some embodiments, iron may comprise iron (II).

As used herein, the term "coagulant" generally may refer to an agent that may typically destabilize colloidal suspensions. Coagulants may comprise iron-based coagulants, such as ferrous chloride, e.g., PIX-411® sold by Kemira, and/or iron chloride. Other examples of iron-based coagulants may include, but are not limited to including iron sulfate and polyferric sulphate. Additional coagulants may comprise but are not limited to comprising inorganic coagulants such as aluminium sulfate ("ALS") and other metal sulfates and gypsum, organic coagulants such as polyamines and poly-DADMACs, and other inorganic and organic coagulants known in the art.

Furthermore, a coagulant may comprise a poly(diallyldimethyl ammonium chloride) ("polyDADMAC") compound; an epi-polyamine compound; a polymer that may comprise one or more quaternized ammonium groups, such as acryloyloxyethyltrimethylammonium chloride, methacryloyloxyethyltrimethylammonium chloride, methacrylamidopropyltrimethylammonium chloride, acrylamidopropyltrimethylammonium chloride; or a mixture thereof. An inorganic coagulant may, for example, reduce, neutralize or invert electrical repulsions between particles. Inorganic coagulants may comprise but are not limited to inorganic salts such as aluminum chloride, aluminum sulfate, aluminum chlorohydrate, polyaluminum chloride, polyaluminum silica sulfate, ferric chloride, ferrous chloride, ferric sulfate, ferric chloride sulfate, polyferric sulfate, ferrous sulfate, lime, calcium chloride, calcium sulfate, magnesium chloride, sodium aluminate, various commercially available iron or aluminum salts coagulants, or combinations thereof. In some embodiments, a coagulant may comprise a combination or mixture of one or more organic coagulants with one or more inorganic coagulants. In some embodiments, a coagulant may comprise a combination or mixture of any of the above coagulants.

As used herein, the term "reducing agent" generally refers to any element or compound that loses (or "donates") an electron to another chemical species in a chemical reaction, e.g., a redox reaction. In some embodiments, a reducing agent may comprise bisulfite, metabisulfite, sulfite, sulfur dioxide, and/or hydrated sulfur dioxide. In some embodiments, a reducing agent may comprise compounds such as sulfites, bisulfites, metabisulfites (and in particular metabisulfite, dithionites of alkali or alkaline-earth metals). In some embodiments, a reducing agent may comprise hydrazine and/or its hydroxylamine derivatives or a mixture of sodium borohydride and bisulfite. In some embodiments, a reducing agent may comprise organic sulfites such as alkyl sulfites, alkyl hydrosulfites, sulfinates, sulfoxylates, phosphites, and also oxalic or formic acid or salts of erythorbate and carbohydrazides. In some embodiments, a reducing agent may comprise an oxygen scavenger, such as, but not limited to, carbohydrazide, hydroquinone, diethylhydroxylamine (DEHA), methyl ethyl ketoxime (MEKO), and/or erythorbate. In some embodiments, a reducing agent may comprise a compound that comprises iron and/or a metal. In some embodiments, a reducing agent may comprise the salt form of any compound that may be considered a reducing agent, e.g., sodium metabisulfite. In some embodiments, a reducing agent may comprise sodium dithionite.

As used herein, the terms "stabilizer", "stabilizer additive", and "stabilizing agent" generally refer to generally refer to any material, technique, method, process, composition, and/or compound that may be used to decrease, slow down, prevent, inhibit and/or stop degradation of a polymer. In some embodiments, a stabilizer may comprise thiourea, diethylthiourea, sodium/ammonium thiocyanate, benzotriazole, MBI, and/or MBT. In some embodiments, a stabilizer may comprise a free radical scavenger. In some embodiments, a stabilizer may comprise thiourea, 2-mercaptobenzothiazole, dimedone, N,N'-dimethylthiourea, N,N'-diethylthiourea, N,N'-diphenylthio urea, ammonium thiocyanate, tetramethylthiuram disulphide, 2,2'-dithiobis(benzothiazole), sodium dimethyldithiocarbarnate, paramethoxyphenol propyl, 3,4,5-trihydroxybenzoate, 2,6-di-tert-butyl-4-methylphenol, 2,5-di(tert-amyl) hydroquinone, 4,4'-thiobis(6-tert-butyl-m-cresol), ammonium N-nitrosophenylhydroxylamine, butylhydroxyanisole, hydroxy-8-quinoleine, 4-hydroxy-2,2,6,6-tetramethyl-piperidinooxy, 5-hydroxy-1,4-naphtoquinone, (N-(1,3-dimethylbutyl)N'phenyl-p-phenylenediamine, 2,6-di-tert-butyl-4-methylphenol, 2,5-Di (tert-amyl) hydroquinone, 4,4'-thiobis(6-tert-butyl-m-cresol), dicyandiamide, guanidine, and/or cyanamide. In some embodiments, a stabilizer may comprise thioureas and alkyl thioureas, mercaptobenzoimidazole (MBI) or mercaptobenzothiazole (MBT) and combinations thereof, butyl hydroxyanisole, paramethoxy phenol, quinolinol, 5,5-dimethyl-1,3-cyclohexane dione, and/or sodium thiocyanate. In some embodiments, a stabilizer may comprise diethyl thiourea, dimethyl thiourea, mercaptobenzothiazole and mercapto benzoimidazole. In some embodiments, a stabilizer may comprise a precipitating agent, such as, but not limited hydroxides, carboxylates, carbonates, arsenates, cyanurates, phosphorus derivatives and/or sulfur derivatives; phosphorus salts, sodium phosphate, sodium hydrogenophosphate, phytic acid, or of sulfur salts, sodium sulfide, sodium sulfydrate or, for the family of carbonates, sodium carbonate; sodium carbonate and/or sodium phosphate. In some embodiments, a stabilizer may comprise a sacrificial agent such as those in the family of alcohols, such as, for example, monoalcohols, polyols, glycerol, propylene glycol, trimethyleneglycol, isopropanol, 1,2-butanediol, 1,3-butanediol, 1,4-butanediol, 2,3-butanediol, 1,2,4-butanetriol, pentaerythritol (FETA), trimethylolethane, neopentylglycol, 1,-pentanedial, 2,4-pentanediol, 2,3-pentanediol, trimethylolpropane, and/or 1,5-pentanediol, polyvinyl alcohol partially or totally hydrolyzed. In some embodiments, a stabilizer may comprise an antioxidant.

As used herein, the term "anoxic" generally refers to the absence of free oxygen, but the presence of bound oxygen, in an environment. In some embodiments, treatment of produced water may comprise treatment of anoxic produced water and/or treatment of produced water in an anoxic environment. In some embodiments, produced water may comprise one or more water soluble polymers, and said polymers may comprise oxygen. Said polymers may be the only source of oxygen in said produced water in some embodiments.

Figure 1:
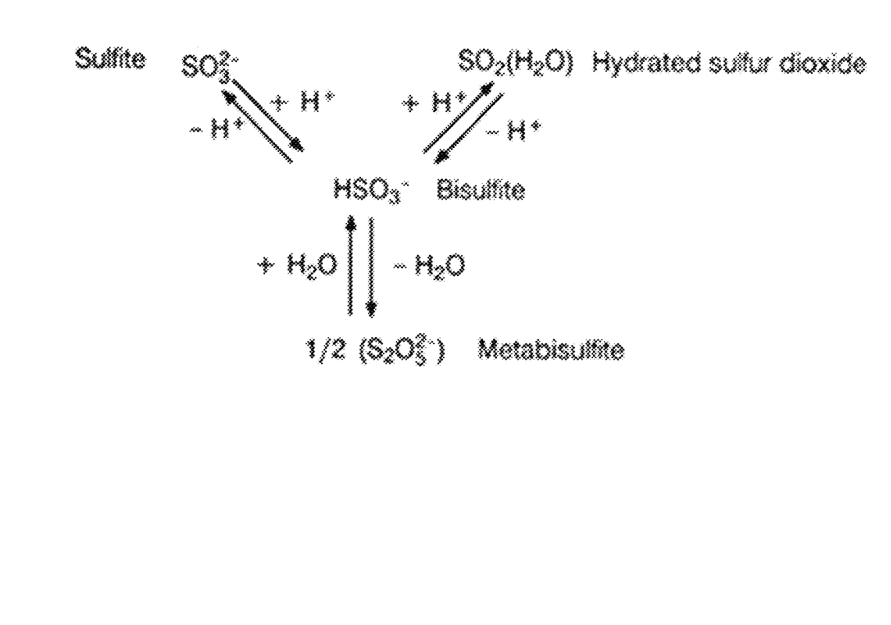
FIG. 1 presents an image depicting the interconversion of various reducing agents.

As used herein, the terms referring to the compounds found in FIG. 1, namely "metabisulfite", "bisulfite", (hydrated) sulfur dioxide, and sulfite, generally refer to the same compound and may be used interchangeably as the compounds are subject to interconversion between the forms. One of skill in the art would know that there exists an interconversion between the forms presented in FIG. 1, and the form that is present as the major form may be dependent on factors such as pH of a solution in which the forms are present. A person of skill in the art would know the desired form in order to produce a desired result, and/or would know the majority form that would be present given the conditions at which the compound is used.

Processes and Compositions

Disclosed herein are processes for the treatment of produced water, such as produced water resulting from any part of an EOR process, such as a polymer flood, comprising one or more water-soluble polymers, typically high molecular weight water soluble polymers which are conventionally used in oil or gas extraction or recovery processes, such as enhanced oil recovery processes. According to some embodiments, the process for treating produced water comprises adding to the produced water one or more reducing agents and one or more metals in an amount effective to reduce the viscosity of the produced water and/or to degrade at least a portion of the one or more water soluble polymers contained therein. The resultant treated water may be recycled and/or stabilized and reused in other industrial processes including e.g., other oil recovery processes or it may be released into the environment. Also disclosed herein are combinations comprising one or more reducing agents and one or more metals suitable for use in processes for treating produced water which comprises one or more water-soluble polymers resulting from at least a portion of the EOR process. Additionally, the present disclosure generally relates to treatment of produced water with one or more reducing agents and one or more metals as described herein, and further wherein a stabilizing agent is added to said treated produced water. Said stabilizing agent may decrease, slow down, prevent, inhibit, and/or stop a polymer degradation reaction that may otherwise occur as a result of treatment of said produced water with said one or more reducing agents and said one or more metals.

According to some embodiments, the produced water which is treated results from a polymer flood process. In some embodiments, the produced water comprises one or more water-soluble polymers, such as, for example, one or more water soluble, high molecular weight anionic polyacrylamide-based polymers. In some embodiments, the produced water comprises one or more acrylamide-containing (co)polymers and/or one or more polymers comprising monomers of acrylamide and acrylic acid.

According to some embodiments, the process for treatment of produced water involves adding to the produced water one or more reducing agents, such as MBS or its related forms (see FIG. 1), and one or more metals, such as a iron and/or a compound comprising iron, generally in the $Fe^{2+}$ form. Said related forms of MBS may comprise a compound comprising metabisulfite, bisulfite, (hydrated) sulfur dioxide, and/or sulfite. In some embodiments, the one or more reducing agents for use with the processes and compositions described herein may comprise hydrazine and/or its hydroxylamine derivatives and/or a mixture of sodium borohydride and bisulfite. Furthermore, in some embodiments, one or more reducing agents for use with the processes and compositions described herein may comprise organic sulfites such as alkyl sulfites, alkyl hydrosulfites, sulfinates, sulfoxylates, phosphites, and also oxalic or formic acid or salts of erythorbate and carbohydrazides; an oxygen scavenger, such as, but not limited to, carbohydrazide, hydroquinone, diethylhydroxylamine (DEHA), methyl ethyl ketoxime (MEKO), erythorbate; iron; the salt form of any compound that may be considered a reducing agent, e.g., sodium metabisulfite; and/or sodium dithionite. In some embodiments, one or more metals for use with the processes and compositions described herein may comprise iron and/or a compound comprising iron.

According to the some embodiments, the one or more reducing agents and one or more metals may be pre-mixed or combined prior to being added to the produced water. In some embodiments, the one or more reducing agents and the one or more metals may be added to the produced water separately but simultaneously. In some embodiments, the one or more reducing agents and the one or more metals may be added to the produced water at different times.

In some embodiments the amount of the one or more reducing agents and one or more metals used to treat the produced water comprises any amount that achieves a desired effect, generally reduction of viscosity of the treated produced water and/or degradation of water soluble polymers comprised therein. For example, the amount added may comprise an amount that achieves a desired reduction in viscosity of the produced water that is to be or is treated or a desired amount or degree of degradation of water soluble polymers comprised therein. Furthermore, in some embodiments, the dosage of either one or more reducing agents or one or more metals used in a treatment processes is that which produces a necessary or desired effect. The dosage of the one or more reducing agents or the dosage of the one or more metals may vary, for example, at least in part based upon the quality of the produced water, the components of the produced water, the concentration of the polymer in the produced water, the type of polymer in the produced water, oxygen content of the produced water, and/or the treatment process, the type of reducing agent and/or metal, as well as the desired result.

In some embodiments, the process for the treatment of produced water using one or more reducing agents and one or more metals comprises mixing of the one or more reducing agents and/or one or more metals with the produced water. In general the type of mixing used includes any type conventionally used in industrial processes, such as EOR processes that produce a necessary or desired effect. In some embodiments, mixing may be conducted using a mixing apparatus, which may be a mixing tank with a mixer, a horizontal mixer, or a screw mixer. The mixing tank typically may be equipped with a blade mixer. In some embodiments, magnetic steering may be used for mixing. In some embodiments, an overhead mixer may be used for mixing.

In some embodiments, the process for the treatment of produced water using one or more reducing agents and one or more metals may be conducted, on-site, e.g., at any onshore oil field, at any offshore oil field, at a treatment facility, at a disposal well, or at any other location where produced water is present.

According to some embodiments, the process for treating produced water which contains one or more polymers may comprise treatment of anoxic produced water and/or treatment of produced water under anoxic conditions. In some embodiments, the only oxygen present in the produced water to be treated or undergoing treatment may originate or be present in the one or more polymers contained in said produced water. In some embodiments, oxygen may be added to the produced water before, during, and/or after treatment according to the processes described herein. In some embodiments, oxygen may added through the addition of water containing dissolved oxygen, e.g., by the addition of surface water, air bubbling, and/or pressurized air. In some embodiments, the addition of oxygen to the produced water may increase the degradation of the one or more polymers, optionally wherein the amount of added oxygen correlates to the amount of degradation. In some embodiments, the addition of oxygen to the produced water may decrease the viscosity of the produced water, optionally wherein the amount of added oxygen correlates to the reduction of viscosity.

In some embodiments, an increased dosage of one or more reducing agents and/or one or more metals used in treating the produced water may result in a corresponding decrease in the viscosity of said produced water. In some embodiments, an increased dosage of one or more reducing agents and/or one or more metals used in the processes for the treatment of produced water may result in a corresponding increase in the degradation of the one or more polymers that corresponds to the addition of oxygen to the produced water.

In some embodiments, the treatment of produced water comprising one or more polymers with one or more reducing agents and one or more metals may degrade said one or polymers, e.g., reduce the molecular weight of said one or more polymers in the produced water. Furthermore, in some embodiments, the treatment of produced water using one or more reducing agents and one or more metals may reduce the viscosity of the produced water. Such treatment processes may be used to reduce the viscosity of the produced water to any necessary or desired viscosity. For example, a treatment process may result in in a reduction in viscosity of said produced water by about 10% or less, 10% or more, 15% or more, 20% or more, 25% or more, 30% or more, 35% or more, 40% or more, 45% or more, 50% or more, 55% or more, 60% or more, 62% or more, or 65% or more.

According to some embodiments treatment of the produced water may reduce the viscosity to a level that is beneficial for reinjection, stabilization or (environmentally acceptable) disposal purposes. In some embodiments, treatment of the produced water according to the processes described herein may result in a treated produced water that may be reused in the same or other industrial processes such as EOR processes or it may be released into the environment. In some embodiments, produced water which has been treated in accordance with the processes described herein may be reused for polymer injection, backflow water application, and/or water injection. In some embodiments, treating produced water according to the processes described herein may result in treated produced water that may be used more efficiently in skim tank settling as compared to the untreated produced water and/or the produced water treated by other processes conventionally used in the industry. In some embodiments, the treated water resulting from the processes disclosed herein may be recycled to one or more oil recovery processes, such as an EOR process.

In some embodiments, the treatment process may occur at temperatures ranging from ambient temperature to about 100° C. In some embodiments, the treatment process may occur at about 50° C. or less, 50° C. or more, 55° C. or more, 60° C. or more, 65° C. or more, 70° C. or more, 75° C. or more, 80° C. or more, 85° C. or more, 90° C. or more, 95° C. or more, or 100° C. or more.

In some embodiments, the process to treat produced water using one or more reducing agents and one or more metals may be used alone, e.g., consist of this treatment method, or this treatment method may be used in combination with one or more additional processes, e.g., those conventionally used in the industry to treat produced water. Other processes for produced water treatment include, for example, mechanical treatments (e.g., membrane filtration), chemical treatments (e.g., oxidizing agents), and biological treatments (e.g., microbiological processes).

Additionally, the present disclosure generally relates to treatment of produced with one or more reducing agents and one or more metals as described herein, wherein a stabilizing agent is further added to the produced water before, after or during treatment. Specifically, the present embodiments encompass a process of treating produced water that includes the addition of one or more reducing agents and one or more metals during treatment of the produced water, wherein at least one stabilizing agent is added to slow, decrease, prevent, inhibit, and/or stop the degradation or further degradation of water soluble polymers and/or to increase or maintain the viscosity of the produced water. In some embodiments, said at least one stabilizing agent may be added while water soluble polymers are present in the produced water in order to slow, decrease, prevent, inhibit and/or stop the degradation or further degradation of said at least one water soluble polymer and/or to increase or maintain the viscosity of the produced water, and/or said at least one stabilizing agent is added contemporaneous or prior to the addition of at least one water soluble polymer in order to slow, decrease, prevent, and/or stop the degradation of said added at least one water soluble polymer and/or to increase or maintain the viscosity of the produced water. In some embodiments, the process for treating produced water may comprise (i) adding at least one stabilizing agent while water soluble polymers are present in the produced water in order to slow, decrease, prevent, and/or stop the degradation or further degradation of said at least one water soluble polymer comprised in the produced water and/or to increase or maintain the viscosity of the produced water and/or (ii) adding an amount of at least one additional water soluble polymer contemporaneous or after the addition of the at least one stabilizing agent in order to slow, decrease, prevent, and/or stop the degradation of said further added at least one water soluble polymer and/or to increase or maintain the viscosity of the produced water. In other embodiments processes of treating produced water are provided which include the addition of at least one stabilizing agent at different times during treatment of the produced water in order to slow, decrease, prevent, inhibit and/or stop the degradation or further degradation of water soluble polymers or another material susceptible to degradation by the one or more reducing agents and one or more metals and/or to increase or maintain the viscosity of the produced water.

In some embodiments, said stabilizing agent may decrease, slow down, prevent, inhibit and/or stop polymer degradation reaction that may otherwise occur as a result of treatment of said produced water with said one or more reducing agents and said one or more metals. In some embodiments, the produced water may be treated as described herein, a stabilizing agent may be added, and subsequently more polymer, e.g., water soluble polymer, may be added to said produced water, wherein addition of the stabilizing agent protects the newly added polymer such that said polymer is degraded to a lesser amount than said polymer would otherwise degrade without the addition of said stabilizing agent. In some embodiments, such stabilizing agent may comprise thiourea, diethylthiourea, sodium/ammonium thiocyanate, benzotriazole, MBI, and/or MBT.

In some embodiments, a stabilizing agent may comprise a free radical scavenger; thiourea, 2-mercaptobenzothiazole, dimedone, N,N'-dimethylthiourea, N,N'-diethylthiourea, N,N'-diphenylthio urea, ammonium thiocyanate, tetramethylthiuram disulphide, 2,2'-dithiobis(benzothiazole), sodium dimethyldithiocarbarnate, paramethoxyphenol propyl, 3,4,5-trihydroxybenzoate, 2,6-di-tert-butyl-4-methylphenol, 2,5-di(tert-amyl) hydroquinone, 4,4'-thiobis(6-tert-butyl-m-cresol), ammonium N-nitrosophenylhydroxylamine, butylhydroxyanisole, hydroxy-8-quinoleine, 4-hydroxy-2,2,6,6-tetramethyl-piperidinooxy, 5-hydroxy-1,4-naphtoquinone, (N-(1,3-dimethylbutyl)N'phenyl-p-phenylenediamine, 2,6-di-tert-butyl-4-methylphenol, 2,5-Di (tert-amyl) hydroquinone, 4,4'-thiobis(6-tert-butyl-m-cresol), dicyandiamide, guanidine, and/or cyanamide; thioureas and alkyl thioureas, mercaptobenzoimidazole (MBI) or mercaptobenzothiazole (MBT) and combinations thereof, butyl hydroxyanisole, paramethoxy phenol, quinolinol, 5,5-dimethyl-1,3-cyclohexane dione, and/or sodium thiocyanate; diethyl thiourea, dimethyl thiourea, mercaptobenzothiazole and mercapto benzoimidazole; a precipitating agent such as, but not limited hydroxides, carboxylates, carbonates, arsenates, cyanurates, phosphorus derivatives and/or sulfur derivatives; phosphorus salts, sodium phosphate, sodium hydrogenophosphate, phytic acid, or of sulfur salts, sodium sulfide, sodium sulfydrate or, for the family of carbonates, sodium carbonate; sodium carbonate and/or sodium phosphate; a sacrificial agent, such as those in the family of alcohols, such as, for example, monoalcohols, polyols, glycerol, propylene glycol, trimethyleneglycol, isopropanol, 1,2-butanediol, 1,3-butanediol, 1,4-butanediol, 2,3-butanediol, 1,2,4-butanetriol, pentaerythritol (FETA), trimethylolethane, neopentylglycol, 1, -pentanedial, 2,4-pentanediol, 2,3-pentanediol, trimethylolpropane, and/or 1,5-pentanediol, polyvinyl alcohol partially or totally hydrolyzed; and/or an antioxidant.

In some embodiments, additional water soluble polymer may be added after the addition of said stabilizing agent. In further embodiments, addition of a stabilizing agent to a treated produced water sample may comprise the addition of fresh polymer to said treated produced water sample before, during or after the addition of said stabilizing agent.

In some embodiments, treatment of produced water as described herein in conjunction with addition of a stabilizing agent may slow down, decrease, prevent, inhibit and/or stop polymer degradation such that the treated produced water may be used to dissolve new polymer for injection without degradation of said new polymer. In some embodiments, said produced water may be anoxic produced water, and/or the treatment of said produced water may be conducted in an anoxic environment, and a stabilizing agent may additionally be added to said treated produced water prior to or contemporaneous to the addition of new polymer, wherein said new polymer may not be degraded or may not be degraded as much as said polymer would otherwise be without the addition of said stabilizing agent. In some embodiments a stabilizing agent may be added to produced water that has been treated as described herein, i.e., treated with one or more reducing agents and one or more metals, after the viscosity of said produced water has reached a desired value. In some embodiments, produced water may be treated with one or more reducing agents and one or more metals as described herein, and said treated water may be used as make-up water for injection with the addition of stabilizing agent, such as, for example, thiourea, diethylthiourea, sodium/ammonium thiocyanate, benzotriazole, MBI, and/or MBT, as said stabilizing agent may protect any polymer that may be newly added to said treated produced water from degradation.

In some embodiments, the treatment of produced water as described herein in conjunction with a stabilizing agent may result in a water which may be reused and/or stabilized; e.g., it may be reused the same or other industrial processes or released into the environment. In some embodiments, the treatment of produced water as described herein in conjunction with a stabilizing agent may be effected at different places, e.g., it may occur on-site, at any onshore oil field, at any offshore oil field, at a treatment facility, at a disposal well, or at any other location where produced water is present.

Furthermore, the present disclosure generally encompasses a composition suitable for use in treating produced water, comprising the combination of (i) one or more stabilizing agents and either or both of the following (ii) one or more reducing agents and one or more metals, and (iii) one or more water soluble polymers; wherein the one or more stabilizing agents are capable of preventing or inhibiting the degradation of (iii) one or more water soluble polymer by the (ii) one or more reducing agents and one or more metals if said (iii) one or more water soluble polymers are present. In some embodiments, said composition may comprise (i) one or more stabilizing agents, (ii) one or more reducing agents and one or more metals, and (iii) one or more water soluble polymers. Moreover, in some embodiments, said produced water may comprise anoxic produced water and/or polymer flooded produced water and/or the treatment process may occur in an anoxic environment. In some embodiments, said produced water may comprise one or more PAMs, e.g., any polymers or co-polymers comprising acrylamide moieties, e.g., one or more acrylamide (co)polymers, e.g., one or more polymers comprising acrylamide and acrylic acid. Said one or more PAMs may comprise one or more HPAMs and/or one or more DPAMs. In some embodiments, said produced water may comprise one or more water soluble, high molecular weight anionic polyacrylamide-based polymers. In some embodiments, a composition suitable for use in treating produced water, comprising the combination of (i) one or more stabilizing agents and either or both of the following (ii) one or more reducing agents and one or more metals, and (iii) one or more water soluble polymers; wherein the one or more stabilizing agents are capable of preventing or inhibiting the degradation of (iii) one or more water soluble polymer by the (ii) one or more reducing agents and one or more metals if said (iii) one or more water soluble polymers are present. In some embodiments, said composition may be used with any of the processes described herein.

The following examples are presented for illustrative purposes only and are not intended to be limiting.

EXAMPLES

Example 1

In this example, a simulated produced water sample that included a commercially available water soluble, high molecular weight anionic polyacrylamide-based polymer (Polymer A) was prepared and treated. Sample solutions used in the present example were made in an anoxic chamber in order to minimize the oxygen concentration of the samples. Mixing of the solutions occurred in a reactor, and the viscosities were measured in an anoxic chamber.

First, 300 mL of a first anoxic synthetic injection brine, SIB1, was prepared (see Table 1 for composition) with the further addition of 15 ppm $HSO_3^-$, in the form of $NaHSO_3$. Next, a polymer mother solution containing 5,000 ppm of Polymer A was made in SIB1, wherein Polymer A was added and mixed for 2 hours with said brine. Separately, a second synthetic injection brine, SIB2, was prepared. 300 mL of SIB2 was prepared comprising the composition as presented as Table 1 with the further addition of 2 ppm of $Fe^{2+}$. After their respective preparations, SIB1 and SIB2 were mixed together such that Polymer A was at a concentration of 2500 ppm, and the total volume of the solution was 600 mL. The initial viscosity value of this solution was 49.9 cP. Next, the solution was mixed for 1 hour in an anoxic chamber at 60° C. After mixing for 1 hour the viscosity of the solution was measured (see Table 2). Following the viscosity measurement, 11 mL of oxygen saturated SIB was added to the solution. Next, this solution was mixed for 1 hour at 60° C., and after the 1 hour time period, the viscosity was once again measured (see Table 2).

TABLE 1

| COMPONENT | CONCENTRATION (PPM) |
| --- | --- |
| NaCl | 2936 |
| KCl | 114 |
| $CaCl_2 \cdot 2 H_2O$ | 858 |
| $MgCl_2 \cdot 6 H_2O$ | 509 |
| $Na_2SO4$ | 473 |
| $NaHCO_3$ | 1067 |
| TDS | 5958 |

As presented in Table 2, addition of the combination of a metal, iron, and a reducing agent was able to reduce the viscosity from 49.9 cP to 25.2 cP in 1 hour, and to 19 cP after 2 hours with a low addition of oxygen between the 1 hour and 2 hour timepoint measurements. Additionally, the solution was noted to have turned to a light yellow color at the 2 hour timepoint, which thereby indicated that the iron in the system was being oxidized.

TABLE 2

| TIMEPOINT | VISCOSITY (cP) | % VISCOSITY REDUCTION |
| --- | --- | --- |
| 0 h | 49.9 | N/A |
| 1 h | 25.2 | 49.5% |
| 2 h | 19.0 | 61.9% |

ORP = Oxygen Reduction Potential
DO = Dissolved Oxygen

In the preceding procedures, various steps have been described. It will, however, be evident that various modifications and changes may be made thereto, and additional procedures may be implemented, without departing from the broader scope of the procedures as set forth in the claims that follow.

The invention claimed is:

1. A process for treating produced water comprising one or more water soluble high molecular weight polymers used for enhanced oil recovery (EOR) or polymer flooding comprising:
    (i) a first treatment step comprising the addition of (1) an amount of one or more reducing agents and (2) iron and/or a compound comprising iron in the $Fe^{+2}$ form, wherein:
    (a) the amounts of (1) and (2) in combination are sufficient to reduce the viscosity of the produced water and/or to degrade a portion of said one or more water soluble polymers; and
    (b) said first treatment step is effected for a time sufficient to provide for the reduction of the viscosity of the produced water and/or the degradation of at least a portion of said one or more water soluble polymers; and wherein
    (c) said first treatment step is effected under anoxic conditions or without the addition of oxygen to the produced water being treated.

2. The process of claim 1, which includes a second treatment step which is effected after the first treatment step which comprises the addition of oxygen to the treated produced water resulting from the first treatment step thereby increasing the amount of dissolved oxygen therein which second treatment step is effected for a time sufficient to provide for a further reduction of the viscosity of the produced water and/or provide for the further degradation of at least a portion of the one or more water soluble polymers comprised in the treated produced water, and which second treatment step does not include the addition of a reducing agent.

3. The process of claim 2, where in the second treatment step:
    (i) said oxygen is added through the addition of water containing dissolved oxygen;
    (ii) said addition of oxygen results in a corresponding increase in the degradation of said polymer; and/or
    (iii) said addition of oxygen results in a corresponding decrease in the viscosity of the produced water.

4. The process of claim 2, wherein in the second treatment step said oxygen addition is effected by the addition of surface water; air bubbling; and/or pressurized air.

5. The process of claim 2, where in the second treatment step the amount of added oxygen correlates to the further reduction of viscosity, and/or the further reduction of polymer degradation.

6. The process of claim 2, which
    (i) results in an overall reduction in viscosity of said produced water of at least 20%; and/or
    (ii) is effected at a temperature of at least 50° C.

7. The process of claim 2, which further includes another step which is effected after the second treatment step, which another step comprises the addition of at least one stabilizing agent to the treated produced water, wherein the addition thereof slows or arrests the further degradation of water soluble polymers comprised in the treated produced water and/or increases or maintains the viscosity of the treated produced water.

8. The process of claim 7, wherein
    (1) said stabilizing agent comprises (i) thiourea, diethylthiourea, sodium/ammonium thiocyanate, benzotriazole, MBI, and/or MBT; (ii) a free radical scavenger; thiourea, 2-mercaptobenzothiazole, dimedone, N,N'-dimethylthiourea, N,N'-diethylthiourea, N,N'-diphenylthio urea, ammonium thiocyanate, tetramethylthiuram disulphide, 2,2'-dithiobis(benzothiazole), sodium dimethyldithiocarbarnate, paramethoxphenol propyl, 3,4,5-trihydroxybenzoate, 2,6-di-tert-butyl-4-methylphenol, 2,5-di(tert-amyl) hydroquinone, 4,4'-thiobis (6-tert-butyl-m-cresol), ammonium N-nitrosophenylhydroxylamine, butylhydroxyanisole, hydroxy-8-quinoleine, 4-hydroxy-2,2,6,6-tetramethyl-piperidinooxy, 5-hydroxy-1,4-naphtoquinone, (N-(1,3-dimethylbutyl)N'phenyl-p-phenylenediamine, 2,6-ditert-butyl-4-methylphenol, 2,5-Di (tert-amyl) hydroquinone, 4,4'-thiobis(6-tert-butyl-m-cresol), dicyandiamide, guanidine, and/or cyanamide; thioureas and alkyl thioureas, mercaptobenzoimidazole (MBI) or mercaptobenzothiazole (MBT) and combinations thereof, butyl hydroxyanisole, paramethoxy phenol, quinolinol, 5,5-dimethyl-1,3-cyclohexane dione, and/or sodium thiocyanate; diethyl thiourea, dimethyl thiourea, mercaptobenzothiazole and mercapto benzoimidazole; a precipitating agent, a precipitating agent selected from hydroxides, carboxylates, carbonates, arsenates, cyanurates, phosphorus derivatives and/or sulfur derivatives; phosphorus salts, sodium phosphate, sodium hydrogenophosphate, phytic acid, sulfur salts, sodium sulfide, sodium sulfydrate, sodium carbonate; sodium carbonate and/or sodium phosphate; a sacrificial agent, monoalcohols, polyols, glycerol, propylene glycol, trimethyleneglycol, isopropanol, 1,2-butanediol, 1,3-butanediol, 1,4-butanediol, 2,3-butanediol, 1,2,4-butanetriol, pentaerythritol (FETA), trimethylolethane, neopentylglycol, 1, -pentanedial, 2,4-pentanediol, 2,3-pentanediol, trimethylolpropane, and/or 1,5-pentanediol, polyvinyl alcohol partially or totally hydrolyzed; and/or an antioxidant;

(2) additional water soluble polymer is added following, during or prior to the addition of said stabilizing agent; and/or (3) said stabilizing agent is added after the viscosity of said treated produced water has been determined to reach a particular value.

9. The process of claim 2, wherein (i) the treated produced water is used for reinjection in an industrial process; (ii) the treated produced water is disposed of after treatment, (iii) the treated produced water is reused for polymer injection, backflow water application, and/or water injection; (iv) the treated produced water is used for skim tank settling, (v) the treatment of the produced water occurs on-site, at any onshore oil field, at any offshore oil field, at a treatment facility, at a disposal well, or at any other location where produced water is present and/or treated; or any combination of the foregoing.

10. The process of claim 1 which does not include the addition of oxygen.

11. The process of claim 1 wherein said produced water is produced during a polymer flooding process or is generated during any part of an enhanced oil recovery process.

12. The process of claim 1 wherein said one or more water soluble polymers comprises one or more polyacrylamides (PAMs).

13. The process of claim 1 wherein said one or more water soluble polymers comprise polymers or co-polymers comprising acrylamide moieties, one or more acrylamide (co)polymers, and/or one or more water soluble high molecular weight anionic polyacrylamide-based polymers.

14. The process of claim 1 wherein said one or more water soluble polymers comprise: (i) high molecular weight polyacrylamide and/or copolymers of acrylamide and one or more other monomers, (ii) partly hydrolyzed polyacrylamide ("HPAM") in which some of the acrylamide units have been hydrolyzed to acrylic acid, (iii) high molecular weight anionic polyacrylamide based polymers, (iv) naturally occurring polymers, (v) xanthan or polyglycosylglucan polymers, or (vi) any combination of the foregoing.

15. The process of claim 1 wherein said one or more water soluble polymers comprise high molecular weight anionic polyacrylamide based polymers.

16. The process of claim 1 wherein said one or more reducing agents comprise (i) a compound comprising metabisulfite, bisulfite, (hydrated) sulfur dioxide, and/or sulfite, (ii) hydrazine and/or its hydroxylamine derivatives and/or a mixture of sodium borohydride and bisulfite, (iii) at least one organic sulfite, (iv) alkyl sulfites, alkyl hydrosulfites, sulfinates, sulfoxylates, phosphites, oxalic or formic acid or salts of erythorbate and carbohydrazides; (v) oxygen scavengers, (vi) carbohydrazide, hydroquinone, diethylhydroxylamine (DEHA), methyl ethyl ketoxime (MEKO), erythorbate; sodium metabisulfite, sodium dithionite or (vii) any combination of the foregoing.

17. The process of claim 1 wherein said one or more reducing agents comprise a metabisulfite, bisulfite, (hydrated) sulfur dioxide, and/or sulfite compound.

18. The process of claim 1 wherein said one or more reducing agents result in the production of $HSO_3^-$.

19. The process of claim 1, which
  (i) results in an overall reduction in viscosity of said produced water of at least 20%; and/or
  (ii) is effected at a temperature of at least 50° C.

20. The process of claim 1, which further includes another step which is effected after the first treatment step, which another step comprises the addition of at least one stabilizing agent to the treated produced water, wherein the addition thereof slows or arrests the further degradation of water soluble polymers comprised in the treated produced water and/or increases or maintains the viscosity of the treated produced water.

21. The process of claim 20, wherein
  (1) said stabilizing agent comprises (i) thiourea, diethylthiourea, sodium/ammonium thiocyanate, benzotriazole, MBI, and/or MBT; (ii) a free radical scavenger; thiourea, 2-mercaptobenzothiazole, dimedone, N,N'-dimethylthiourea, N,N'-diethylthiourea, N,N'-diphenylthio urea, ammonium thiocyanate, tetramethylthiuram disulphide, 2,2'-dithiobis(benzothiazole), sodium dimethyldithiocarbarnate, paramethoxyphenol propyl, 3,4,5-trihydroxybenzoate, 2,6-di-tert-butyl-4-methylphenol, 2,5-di(tert-amyl) hydroquinone, 4,4'-thiobis (6-tert-butyl-m-cresol), ammonium N-nitrosophenylhydroxylamine, butylhydroxyanisole, hydroxy-8-quinoleine, 4-hydroxy-2,2,6,6-tetramethylpiperidinooxy, 5-hydroxy-1,4-naphtoquinone, (N-(1,3-dimethylbutyl)N'phenyl-p-phenylenediamine, 2,6-di-tert-butyl-4-methylphenol, 2,5-Di (tert-amyl) hydroquinone, 4,4'-thiobis(6-tert-butyl-m-cresol), dicyandiamide, guanidine, and/or cyanamide; thioureas and alkyl thioureas, mercaptobenzoimidazole (MBI) or mercaptobenzothiazole (MBT) and combinations thereof, butyl hydroxyanisole, paramethoxy phenol, quinolinol, 5,5-dimethyl-1,3-cyclohexane dione, and/or sodium thiocyanate; diethyl thiourea, dimethyl thiourea, mercaptobenzothiazole and mercapto benzoimidazole; a precipitating agent, a precipitating agent selected from hydroxides, carboxylates, carbonates, arsenates, cyanurates, phosphorus derivatives and/or sulfur derivatives; phosphorus salts, sodium phosphate, sodium hydrogenophosphate, phytic acid, sulfur salts, sodium sulfide, sodium sulfydrate, sodium carbonate; sodium carbonate and/or sodium phosphate; a sacrificial agent, monoalcohols, polyols, glycerol, propylene glycol, trimethyleneglycol, isopropanol, 1,2-butanediol, 1,3-butanediol, 1,4-butanediol, 2,3-butanediol, 1,2,4-butanetriol, pentaerythritol (FETA), trimethylolethane, neopentylglycol, 1, -pentanedial, 2,4-pentanediol, 2,3-pentanediol, trimethylolpropane, and/or 1,5-pentanediol, polyvinyl alcohol partially or totally hydrolyzed; and/or an antioxidant;
(2) additional water soluble polymer is added following, during or prior to the addition of said stabilizing agent; and/or
(3) said stabilizing agent is added after the viscosity of said treated produced water has been determined to reach a particular value.

22. The process of claim 1, wherein (i) the treated produced water is used for reinjection in an industrial process; (ii) the treated produced water is disposed of after treatment, (iii) the treated produced water is reused for polymer injection, backflow water application, and/or water injection; (iv) the treated produced water is used for skim tank settling, (v) the treatment of the produced water occurs on-site, at any onshore oil field, at any offshore oil field, at a treatment facility, at a disposal well, or at any other location where produced water is present and/or treated; or any combination of the foregoing.

* * * * *